Dec. 9, 1958  E. M. ACKLEY  2,863,337
METHOD OF MAKING A CURVED DIE
Filed May 11, 1953  3 Sheets-Sheet 1
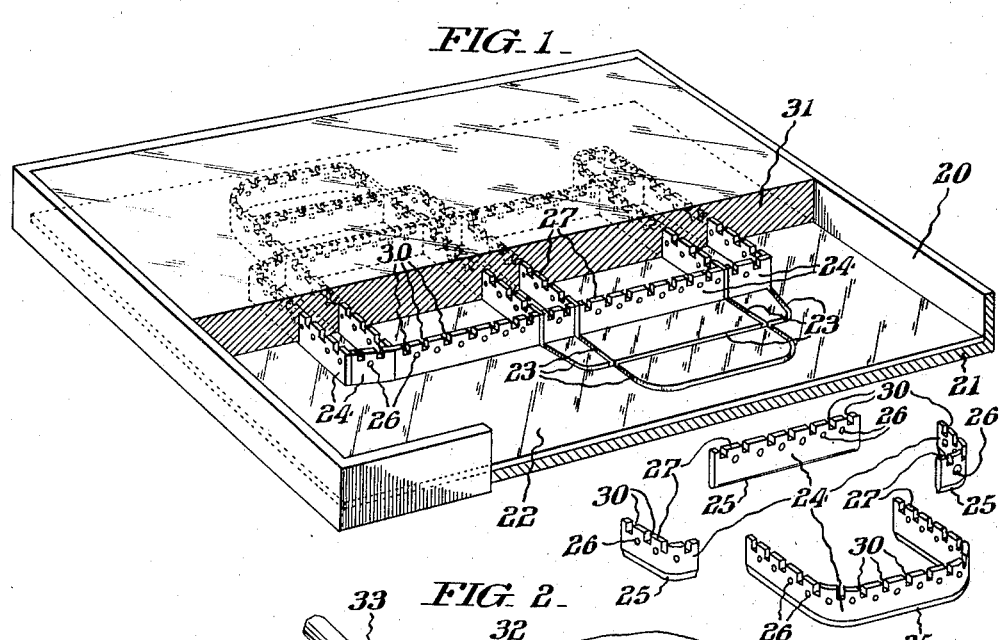
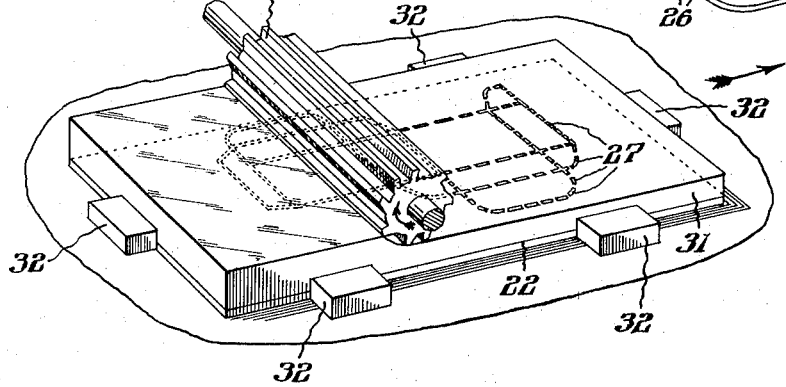
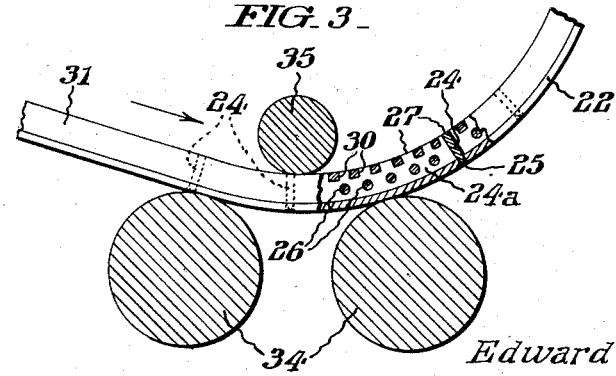
INVENTOR.
Edward M. Ackley,
BY Paul & Paul
ATTORNEYS.

Dec. 9, 1958  E. M. ACKLEY  2,863,337
METHOD OF MAKING A CURVED DIE
Filed May 11, 1953  3 Sheets-Sheet 2
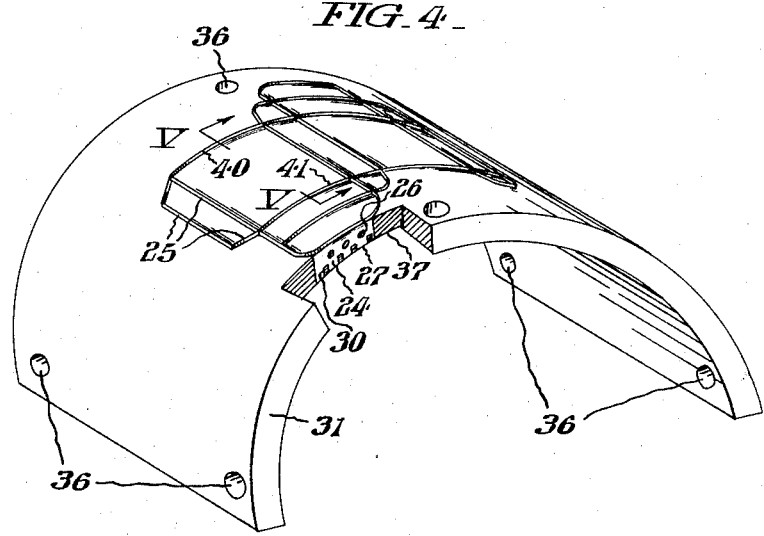
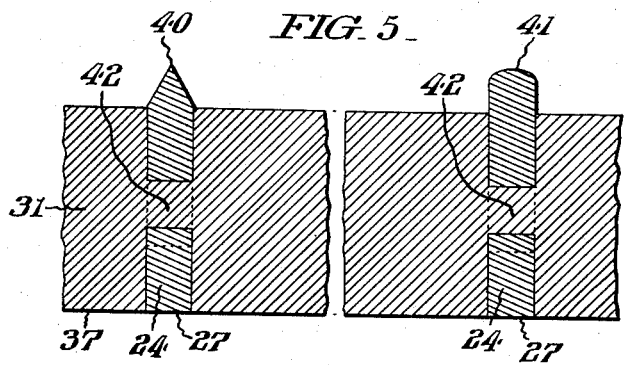
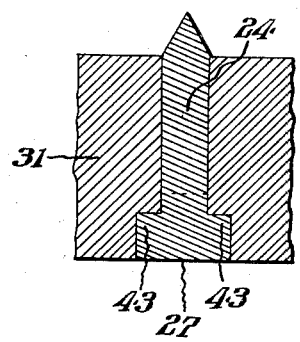
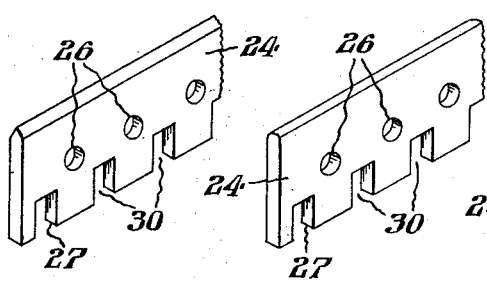
INVENTOR.
Edward M. Ackley,
BY Paul & Paul
ATTORNEYS.

Dec. 9, 1958 — E. M. ACKLEY — 2,863,337
METHOD OF MAKING A CURVED DIE
Filed May 11, 1953 — 3 Sheets-Sheet 3

INVENTOR.
Edward M. Ackley,
BY Paul & Paul
ATTORNEYS.

United States Patent Office 2,863,337
Patented Dec. 9, 1958

2,863,337

METHOD OF MAKING A CURVED DIE

Edward M. Ackley, North Wales, Pa., assignor to R. W. Hartnett Company, Philadelphia, Pa., a corporation of Pennsylvania Application May 11, 1953, Serial No. 354,348

6 Claims. (Cl. 76—107)

This invention relates to a die and to a method of making the same. More specifically the invention relates to a substantially cylindrical die which is adapted to be secured to a rotary power driven member for the mass production of sheet material blanks such as folding box blanks for example. Dies in accordance with this invention have rules which are constructed to cut, to crease or score, or to perforate the sheet material, or to perform a combination of these operations.

Ruled dies of this character have heretofore been manufactured by forming a cylindrical base composed of hard metal such as tool steel or the like, and then milling or routing the steel surface to form a plurality of integral cutting and creasing edges of the desired shape and arrangement. After their formation it has been necessary to sharpen the cutting edges. This has been a time consuming and expensive procedure, particularly the milling or routing operation.

It is accordingly an object of this invention to overcome the disadvantages referred to above. Another object is to provide a simplified method of making a combined cutting and creasing die having a substantially cylindrical shape. Still another object of the invention is to provide a substantially cylindrical die of the character indicated, including cutting rules which may be pre-formed. Other objects and advantages of the invention, including the simplicity and economy of the same will further appear hereinafter and in the drawings whereof:

Fig. 1 represents a view in perspective showing a container in which the cutting and creasing rules are placed in accordance with the method of this invention, some of the rules being removed from the container and shown outside the container in order more clearly to illustrate important details;

Fig. 2 represents a view in perspective of a milling apparatus showing a subsequent step of the method in accordance with this invention;

Fig. 3 represents a sectional view of a rolling mechanism illustrating a subsequent step in the method of this invention;

Fig. 4 represents a view in perspective showing a completed cylindrical ruled die in accordance with this invention;

Fig. 5 represents an enlarged sectional view taken as indicated by the lines and arrows V—V which appear in Fig. 4;

Fig. 6 represents a sectional view similar to Fig. 5, showing a modified form of cutting rule;

Figs. 7–10 represent fragmentary views in perspective showing different forms of rules;

Figure 11:
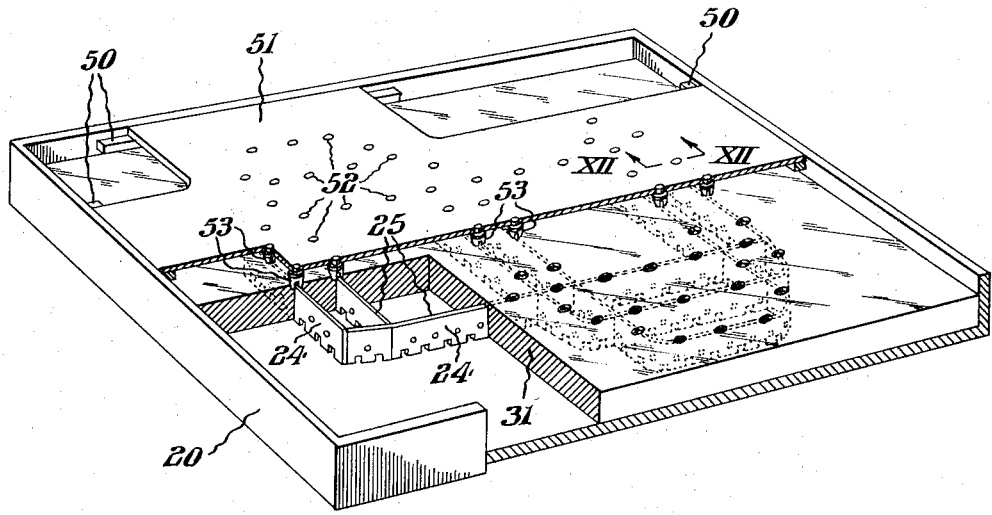
Fig. 11 represents a view in perspective of a container illustrating a modified form of the process in accordance with this invention.
Figure 12:
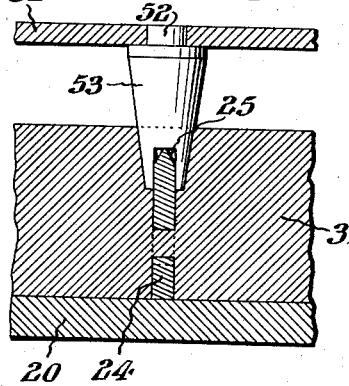
Fig. 12 represents an enlarged sectional view taken as indicated by the lines and arrows XII—XII which appear in Fig. 11.

While I have shown in the drawings several specific examples illustrative of the invention, it will be appreciated that other forms of the apparatus, method and article may be utilized without departing from the scope of the invention. In the description which follows specific terms will be employed for the sake of clarity, but it is to be expressly understood that these specific terms relate to the specific embodiments of the invention selected for illustration in the drawings, and are not intended to limit the scope of the invention.

Turning now to the embodiment of the invention illustrated in Figs. 1–4 of the drawings, the number 20 designates a rectangular container having a flat bottom 21. A flat bendable plate 22, which is preferably a metal plate having a relatively high melting point, is placed on the bottom 21 of container 20. Preferably the metal plate 22 is an aluminum plate, but other metals are suitable. Formed in the plate 22 are a plurality of grooves 23. Grooves 23 are arranged and shaped in accordance with the desired shape of the blank that is to be produced from the completed ruled die.

The number 24 designates comprehensively a plurality of rules which are shaped in accordance with the shapes of the grooves 23. The rules 24 may be cutting or creasing or perforating rules, for example, or a combination of them, depending upon the desired character of the blank to be produced. They are preferably made of relativelty high melting point metal such as steel or preferably tool steel, for example, which has been suitably heat treated. Each rule 24 has a working edge 25 which may be a cutting or creasing or perforating edge, for example. Preferably the working edge 25 is pre-sharpened if a sharp edge is desired. As appears in Fig. 1 of the drawings, the working edge 25 of each rule 24 is embedded in the groove 23 formed in the metal plate 22.

As shown in Fig. 1, each rule is preferably provided with a plurality of holes 26 which extend transversely through the rule. These holes 26 are preferably aligned with one another along a line parallel to the back or non-working edge 27 of the rule. Preferably the holes 26 are closer to the back edge 27 than to working edge 25. Formed in the back edge 27 are a plurality of notches 30 which are uniformly spaced apart from one another. As shown in Fig. 1 the notches 30 are substantially rectangular and extend in a direction perpendicular to the working edge 25 and to the back edge 27 of the rule. As shown, the spacing between the notches 30 is uniform and is equal to the spacing between the holes 26, the holes and notches being alternately arranged.

A molten metal is prepared, such metal preferably having a melting point well below the melting point of the metal rules 24, of the bendable plate 22 and of the rectangular container 20. The molten metal preferably consists of type metal or some other soft metal containing substantial proportions of lead, antimony or both. Specific examples of suitable metals are as follows, parts being by weight:

| Lead     | 3 | 5 | 10 | 70 | 55 | 55 | 7   | 6 | 55 | 55 |
|----------|---|---|----|----|----|----|-----|---|----|----|
| Antimony | 1 | 1 | 1  | 18 | 25 | 30 | 2   | 2 | 23 | 30 |
| Tin      |   |   |    | 10 | 20 | 15 | 0.9 | 2 | 22 | 15 |
| Copper   |   |   |    | 2  |    |    | 0.1 |   |    |    |

Other soft metals have similar utility.

In accordance with my process the rules 24 are preferably but optionally pre-coated with a tinning metal. Conventional tinning metals for use in soft soldering are suitable. The molten metal is then poured into the container 20 to a level above the rules. It coacts with the tinning to form a good bond with the rules. Moreover the metal flows through the holes 26.

It is important that the molten metal, when poured into the container 20 over the rules 24, must not anneal the rules. Accordingly, the molten metal preferably has a melting point not substantially above about 450° to 500° F.

In accordance with this method the metal 31, after pouring, is solidified by cooling it or by allowing it to cool. It will accordingly be appreciated that the metal 31 forms a solid, soft metal base plate in which the rules 24 are anchored, and that the melting point of the soft metal is so low that the cutting, scoring and perforating edges of the rules are not affected by the heat of the metal, nor is the temper or sharpness of the rules substantially affected.

Turning to Fig. 2 of the drawings, the combination consisting of plate 22, soft metal base 31 and the rules anchored therein is then mounted on a suitable support and held in position by blocks 32 for example. The excess metal 31 is then removed down to the level of the back edges 27 of the rules 24. This removal of metal 31 may be accomplished in any convenient manner, for example by means of a conventional milling cutter 33.

Turning to Fig. 3 of the drawings, the resulting flat rectangular combination of plate 22, soft metal base 31 and rules 24 is then bent into a cylindrical form by any conventional bending apparatus such as the 3-roll apparatus shown in Fig. 3. Such apparatus includes a pair of relatively large rolls 34 and a relatively small roll 35, such rolls being spaced apart to provide the desired cylindrical curvature. Other conventional bending means may be substituted.

Upon completion of the bending operation the plate 22, which protects the working edges of the rules 24 during the pouring and bending operations, is removed. A minor amount of soft metal which may have entered the slots 23 during the pouring operation is removed from the slots and from the working edges of the rules. The finished cylindrical die is shown in Fig. 4. It is provided with a suitable number of bolt holes 36 which facilitate its attachment to a revolving cylinder or other suitable mechanism for performing the blank cutting, creasing and perforating operation. The back edges 27 of rules 24 are flush with the concave or inner surface 37 of the cylindrical plate. Thus, in the actual use of the die, the back edges bear directly against the revolving cylinder upon which the die is mounted, without any intervening soft metal.

From Fig. 5 it will be apparent that soft metal anchoring pins 42 are formed integrally with the base metal 31 and extend through the holes in the rules 24 to anchor the rules in the base plate 31. Fig. 5 also shows that some of the rules may be provided with sharp cutting edges 40 while others of the rules 24 in the same die may be provided with blunt creasing edges 41.

Fig. 6 shows a modified form of anchoring means wherein the rule 24 has base flanges 43 which serve to anchor the rule in the base 31.

Fig. 7 shows a cutting rule of the type illustrated in Fig. 1 while Fig. 8 shows a creasing rule of the same type. It will be appreciated that each such rule is adapted to be bent in the plane of the rule itself, along with the bending of the base 31, in the bending operation shown in Fig. 3 of the drawings. This subjects the working edge to considerable tension while the non-working edge is under much less tension, or even compression. Accordingly the bending step is greatly facilitated by the spaced notches 30 which relieve stresses adjacent the non-working edge and minimize warping of the rules incidental to the bending step.

Fig. 9 shows another rule 24 which has a perforating working edge 44 designed to perforate the blanks. The rule shown in Fig. 9 has a series of equally spaced notches 45 which are shaped to form a dovetail engagement with the molten metal 31 thereby anchoring the rule in the metal. The rule 24 shown in Fig. 10 of the drawings has flanges 43 as shown in Fig. 6 and also has a series of equally spaced rectangular notches.

Figure 13:
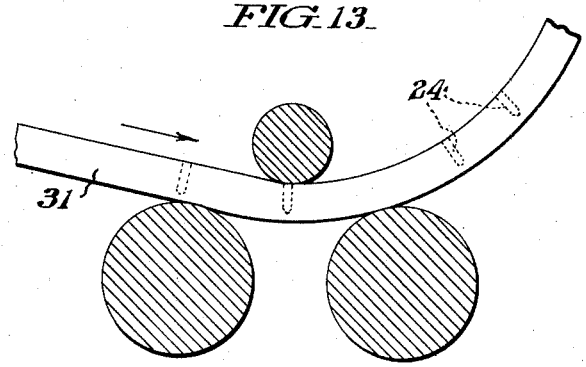
Fig. 13 represents a sectional view of a rolling apparatus illustrating a subsequent step in the modified method.
Figure 14:
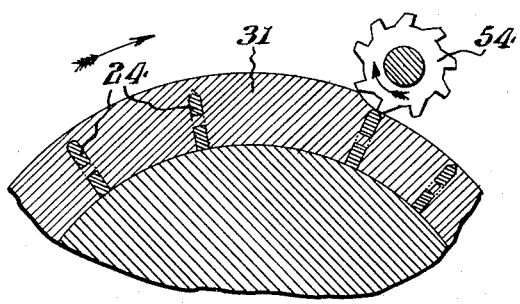
Fig. 14 represents a sectional view showing a milling operation comprising a subsequent step of the modified method.

Turning now to the modified method illustrated in Figs. 11–15 of the drawings, the rules 24 are placed on the bottom of rectangular container 20 with their working edges 25 up. Supported on blocks 50 is a rigid plate 51 carrying a plurality of pins 52 from which are suspended clamping members 53. The clamping members 53 are arranged on the plate 51 to maintain and secure the rules 24 frictionally in the desired arrangement. With all the rules 24 thus secured, the molten metal 31 is poured into the container 20 as heretofore described. The metal is poured above the level of the working edges 25. It is then permitted to solidify. The slotted clamping members 53 are then removed from the rules by lifting the plate 51 away from the solidified metal 31. The base 31 with the rules 24 anchored therein as heretofore described, is then formed into cylindrical shape by bending as illustrated in Fig. 13. The excess metal 31 is then removed down to the level of the working edges 25 by any conventional means such as the milling cutter 54 shown in Fig. 14. Milling cutter 54 is carefully controlled to avoid the sharpened working edges of the cutting rules.

Figure 15:
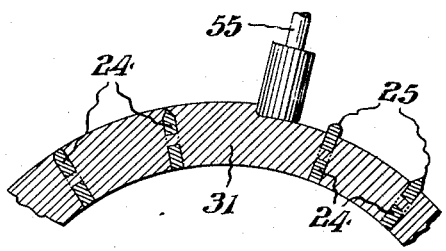
Fig. 15 represents a sectional view showing a routing operation comprising another subsequent step of the modified method.

The ruled die is then completed as shown in Fig. 15 by routing out the metal between the rules, preferably utilizing a conventional routing cutter 55, for example. The sharpened cutting edges are not affected by the routing operation.

From the foregoing description it will be appreciated that the rules are laid out in a flat plane, the soft metal base is cast around the assembled rules, and the resulting flat plate is then bent into a cylindrical form. This bending operation subjects the rules to very substantial stresses and strains, particularly those rules or parts of rules such as the rule 24a in Fig. 3 which extends longitudinally of the base metal. The working edge of rule 24a has a convex curvature and its non-working edge has a concave curvature. Substantial stresses and strains are applied to any rule the working edge of which is curved in the plane of the rule during the bending operation, even though such rule may not lie entirely in a plane perpendicular to the axis of the resulting cylinder, as does the rule 24a in Fig. 3. Because of the thickness of the base metal and the direction in which it is bent the working edge of each rule is extended with respect to the non-working edge. It would be expected that the resulting stresses would warp the rules causing substantial inaccuracies, but that is not the fact in accordance with this invention wherein the non-working faces of the rules are anchored in the soft metal base. After the bending operation the working edges of the rules are arranged and spaced in positions corresponding to their relative positions before bending. Moreover, the bending process tends, in some cases, to anchor the rules more firmly in the base since perpendicular slots 30 as shown in Fig. 7 tend to become angular slots like the slots 45 shown in Fig. 9 as a result of the bending operation.

The term "cylindrical" as utilized herein is intended to comprehend objects generally cylindrical in character, which may consist of all or only part of a cylinder.

While I have referred to the die as a cutting or creasing die, and to the rules as cutting or creasing rules, it will be appreciated that any appropriate rules for cutting, creasing, scoring, perforating, or for performing other analogous operations on any sheet material are within the scope of the invention, and that dies utilizing various combinations of such rules are comprehended by this invention.

Although I have described in considerable detail several specific examples of my invention, together with certain modifications of parts thereof, showing the anchoring of the cutting, creasing and perforating rules in the base metal of the die and the bending of the combined resulting assembly, it will be apparent that the cylindrical die may be made in accordance with a wide variety of methods, and that it is capable of a wide variety of uses. It will also be appreciated that the various anchoring means shown in the drawings may be modified without departing from the scope of this invention and that any such anchoring means may be utilized interchangeably in any desired combination with cutting, scoring, perforating, or other rules, and that other features of this invention may be utilized to advantage without the use of other features, all without departing from the spirit and scope of the invention as defined in the appended claims. It is to be understood that the specific articles and materials referred to and claimed herein are intended to comprehend all mechanical and metallurgical equivalents and reversals of parts which function in similar manner to accomplish the same result.

Having thus described my invention, I claim:

1. In a method of making a die the steps which comprise contacting a rule with a liquid metal which has a melting point lower than the melting point of the rule, said liquid metal having a substantially flat substantially horizontal upper surface, said rule having an upper edge which extends generally along and adjacent said surface, and said rule having a body portion which extends below said surface, solidifying the metal thereby bonding it to said rule below said surface, and bending the combined rule and solidified metal converting the flat upper surface to a curved surface.

2. In a method of making a die the steps which comprise placing a thin metal plate generally horizontally in and below the upper edge of a container, placing a rule on top of said plate in said container, pouring a molten, relatively low melting point metal into said container to a level above said rule, solidifying said metal with a substantially flat upper surface, bending the resulting assembly converting said flat surface to a curved surface, and removing the thin metal plate.

3. In a method of making a die the steps which comprise forming in a piece of bendable metal a depression shaped to receive a rule, placing a rule on the surface of said bendable metal in said depression, covering said bendable metal and rule with a liquid metal having a relatively low melting point, solidifying the liquid metal in a generally flat condition, bending the resulting assembly to a generally curved shape, and removing the bendable metal from the combined rule and solidified metal.

4. In a method of making a die the steps which comprise placing a base plate in a container, placing a rule on the base plate in a plane substantially perpendicular to said base plate, said base plate having a depression therein shaped to receive the working edge of the rule, introducing a liquid metal into the container to a level above said rule, solidifying the metal in a generally flat condition thereby bonding it to said rule, removing the excess solidified metal to the level of the rule, bending the combined rule, solidified metal and base plate in the plane of said rule into a generally curved shape, and removing the base plate from the bent and curved metal and rule.

5. In a method of making a die the steps which comprise introducing a rule into a container with the base of the rule on the bottom of the container and the working edge of the rule up, pouring liquid metal into said container to a level above the working edge of said rule, solidifying the metal in a generally flat condition, removing the combined rule and solidified metal from the container, bending this combination into cylindrical shape, and after said bending removing the metal from above the working edge of the rule to a level below said working edge.

6. In a method of making a curved die, the steps which comprise providing a container means having a bottom, placing a rule having a working edge adjacent said bottom, shielding said working edge, introducing into said container a molten metal having a much lower melting point than the material of the rule, said molten metal contacting the body of the rule but being substantially shielded from the working edge thereof, solidifying said molten metal thereby bonding it to said rule in a generally flat condition, and then bending the resulting composite structure to a curved shape.

References Cited in the file of this patent

UNITED STATES PATENTS

| | | |
|---|---|---|
| 1,056,805 | Laub | Mar. 25, 1913 |
| 1,777,285 | Adsit | Oct. 7, 1930 |
| 1,962,815 | Goffin | June 12, 1934 |
| 2,029,567 | Hough | Feb. 4, 1936 |
| 2,430,359 | Dasher | May 13, 1947 |
| 2,458,867 | Messersmith | Jan. 11, 1949 |